United States Patent [19]
Vross et al.

[11] Patent Number: 5,591,244
[45] Date of Patent: Jan. 7, 1997

[54] SYSTEM FOR REMOVAL OF NOXIOUS FUMES

[75] Inventors: Anthony R. Vross, Youngstown, Ohio; George V. Fagan, Woodbridge, N.J.

[73] Assignees: Simon Roofing and Sheet Metal Corp., Boardman, Ohio; Aercology Incorporated, Old Saybrook, Conn.

[21] Appl. No.: 478,785

[22] Filed: Jun. 7, 1995

[51] Int. Cl.$^6$ .................................................. B01D 50/00
[52] U.S. Cl. ...................... 55/356; 55/323; 55/385.4; 55/467; 55/472; 55/485; 55/486; 96/136; 96/142; 454/65; 454/92
[58] Field of Search ............................... 55/319, 320, 321, 55/322, 323, 356, 385.1, 385.4, 385.7, 467, 472, 485, 486; 96/135, 136, 138, 140, 142; 454/63, 64, 65, 92, 117

[56] References Cited

U.S. PATENT DOCUMENTS

| | | | |
|---|---|---|---|
| 935,681 | 10/1909 | Obermann | 454/65 |
| 2,970,351 | 2/1961 | Rice | 454/63 |
| 3,581,782 | 6/1971 | Onufer | 55/385.4 |
| 3,675,400 | 7/1972 | Kubsch | 55/467 |
| 3,844,901 | 10/1974 | Roe et al. | 55/467 |
| 3,955,236 | 5/1976 | Mckelburg | 55/467 |
| 4,087,333 | 5/1978 | Naevestad | 454/65 |
| 4,450,900 | 5/1984 | Nathan | 165/42 |
| 4,512,245 | 4/1985 | Goldman . | |
| 4,563,943 | 1/1986 | Bertelsen . | |
| 4,770,088 | 9/1988 | Kistner . | |
| 4,804,392 | 2/1989 | Spengler | 55/356 |
| 4,865,628 | 9/1989 | Iwanczyk | 454/65 |
| 5,004,483 | 4/1991 | Eller et al. . | |
| 5,036,754 | 8/1991 | Simms et al. . | |
| 5,064,451 | 11/1991 | Phillips | 55/385.4 |
| 5,069,691 | 12/1991 | Travis et al. . | |
| 5,073,259 | 12/1991 | Solimar | 55/356 |
| 5,160,515 | 11/1992 | Nelson et al. | 55/385.4 |
| 5,191,909 | 3/1993 | Nadeau et al. | 135/93 |
| 5,281,246 | 1/1994 | Ray et al. | 55/302 |

FOREIGN PATENT DOCUMENTS 3734271  4/1989  Germany .................................. 454/92

OTHER PUBLICATIONS

Aercology "Modular Media Filters–It's Time We Cleared the Air" MMF-894 10M 1994.

*Primary Examiner*—C. Scott Bushey
*Attorney, Agent, or Firm*—Sand & Sebolt

[57] ABSTRACT

A system which reduces the transmission of noxious fumes into the surrounding air during the application of a heated liquid roofing product on a roof. A mobile tanker or kettle contains a supply of the heated liquid. The air space within the tanker or vessel above the liquid product communicates with a mobile filtration unit by a first duct. A rooftop carrier for the liquid product has a fume collection hood which communicates with the filtration unit by a second duct. A blower in the filtration unit creates negative pressure which draws the noxious fumes from the tanker or vessel and carrier through the ducts and into and through the filtration unit. The filtration unit has a series of airtight chambers mounted on a mobile truck bed, each containing a different type of filtering medium to remove various components of the noxious fumes as the fumes move through the filtration unit.

22 Claims, 2 Drawing Sheets

5,591,244

SYSTEM FOR REMOVAL OF NOXIOUS FUMES

BACKGROUND OF THE INVENTION

1. Technical Field

The invention relates to a system for removing noxious fumes during the application of a heated roofing product on a roof. More particularly, the invention relates to a mobile unit in which the noxious fumes are removed from the liquid roofing supply tanker or kettle, and from a rooftop carrier for the liquid roofing product, preventing the escape of the noxious fumes produced by the heated roofing product into the surrounding atmosphere. Even more particularly, the invention relates to such a mobile unit having a filtration unit which collects the noxious fumes and removes the majority of the contaminants contained therein prior to discharging the cleaned fumes into the surrounding atmosphere.

2. Background Information

A fume problem exists for roofing companies and their customers during the application of hot roofing materials to a roof for waterproofing the roof. Fumes from roofing tar, asphalt or other bituminous products can contaminate food or beverages, and are potentially hazardous to people inhaling the fumes. The fumes escape at a job site into the surrounding atmosphere from several areas, such as the tanker truck or kettle which holds the heated material to be applied to the roof, and/or the rooftop carrier which holds small amounts of the roofing material on the roof for application of the material by the roofers onto the roof. This problem has been recognized in the industry, and others have attempted to solve the same. For example, U.S. Pat. No. 4,770,088 shows a movable enclosure which moves along the roof and encloses the roofing material application nozzle within the confines of the enclosure to retard the escape of harmful materials and/or noxious fumes into the surrounding atmosphere.

Various other types of filtration units have been used for removing noxious fumes from various types of situations unrelated to the roofing industry, such as shown in U.S. Pat. Nos. 4,450,900, 4,512,245, 4,563,943, 4,804,392, 5,004,483, 5,036,754, 5,069,691, 5,191,909 and 5,281,246. Although these prior art fume removal devices and systems, many of which contain filters for purifying the collected fumes, they are not applicable to the roofing industry since it is necessary that the fume removal system and filtration unit be mobile, enabling the roofer to transport the system rapidly and inexpensively to various job sites in order to be used during the application of the roofing material to the roof.

Thus, the need exists for a system for the removal of noxious fumes during the application of heated roofing material to a roof in which the system is mobile, yet effective for removing the majority of the noxious fumes at a minimum of cost.

SUMMARY OF THE INVENTION

Objectives of the invention include providing a system for the removal of noxious fumes when applying a heated roofing material to a roof wherein the system is mobile and compact, enabling it to be moved between various job sites and positioned in close proximity to the building, often in confined spaces.

A further objective of the invention is to provide such a system which materially reduces the discharge of noxious fumes into the surrounding atmosphere from both the rooftop carrier, which carries a small quantity of the heated material for application to the roof, and from the mobile tanker or kettle, which is usually situated adjacent the building and pumps the heated material to the rooftop carrier located on the roof above.

Another objective of the invention is to provide such a system which includes a mobile filtration unit having a series of filters, each of which removes a particular component from the noxious fumes as the fumes are drawn from the rooftop carrier and tanker or kettle, and through the mobile filtration unit before the fumes are discharged into the surrounding atmosphere.

Still another objective of the invention is to provide such a system in which the filtration unit consists of a series of filters, wherein the various filtering media can be changed to more efficiently remove the various components contained within the noxious fumes of a particular roofing material being utilized on a particular job.

Another objective of the invention is to provide such a system in which the filtration unit can be powered either electrically if a source of electricity is available, or by a fuel-driven engine, such as liquid propane which is usually available on a roofing job site for heating of the roofing material.

A still further objective of the invention is to provide such a system which is relatively compact and mobile, and is easily transported to a job site and set up for operation with a minimum amount of workers and time.

These objectives and advantages of the system of the present invention for the removal of noxious fumes during the application of a liquid roofing product to a roof include a mobile vessel adapted to contain a supply of a liquid roofing product; a mobile filtration unit having an inlet and an outlet; first duct means extending between the vessel and the filtration unit for drawing fumes accumulating above the roofing product within the vessel into the filtration unit; a mobile carrier adapted to hold a quantity of the roofing product on a roof of a building adjacent the vessel and filtration unit; second duct means extending between the carrier and the filtration unit for drawing fumes from the carrier into the filtration unit; and blower means for moving the fumes from the carrier and vessel duct means through the filtration unit to condition the fumes before discharging them into the surrounding atmosphere.

BRIEF DESCRIPTION OF THE DRAWINGS

A preferred embodiment of the invention, illustrative of the best mode in which applicants have contemplated applying the principles, is set forth in the following description and is shown in the drawings and is particularly and distinctly pointed out and set forth in the appended claims.

Similar numerals refer to similar parts throughout the drawings.

DESCRIPTION OF THE PREFERRED EMBODIMENT

Figure 1:
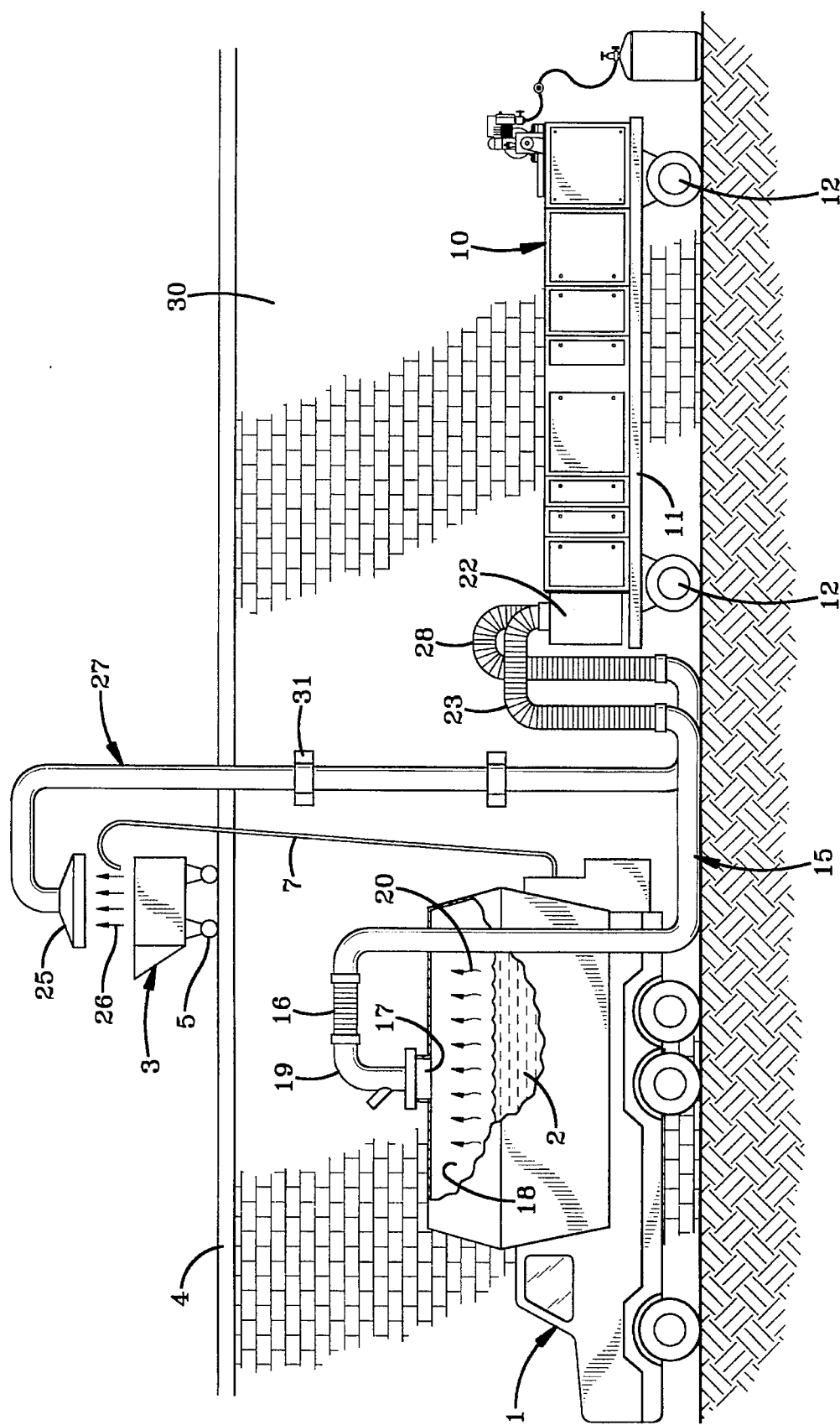
FIG. 1 is a diagrammatic elevational view showing the system of the present invention consisting of a mobile tanker, a filtration unit and a rooftop carrier at a job site.

The system of the present invention for the removal of noxious fumes during the application of a heated roofing material to a roof is shown diagrammatically in FIG. 1. The system includes a usual mobile kettle or roofing tanker, indicated generally at 1, which contains a supply of heated liquid roofing material 2, such as tar or various types of heated bituminous material, which materials are standard and used throughout the roofing industry. A self-contained mobile roofing tanker 1 is shown in the drawings and described below for transporting the material to a job site. However, a usual heated kettle of the type mounted on a trailer and pulled by a separate vehicle can also be used without affecting the concept of the invention. These units are referred to as a mobile vessel.

The improved system further includes a usual rooftop carrier 3 which is movable across a roof 4 on a plurality of wheels 5 for containing a small amount of roofing product 2 in a heated state for application on the roof by the workers as carrier 3 is moved therealong, usually by manually pushing the carrier across the roof. The liquid roofing material will usually be pumped from the mobile vessel into rooftop carrier 3 through a material supply line 7 which extends between the vessel and rooftop carrier.

In accordance with one of the features of the invention, a mobile filtration unit, indicated generally at 10, is in close association with tanker 1 and rooftop carrier 3. Filtration unit 10 includes a flatbed trailer 11 movable by a plurality of pneumatic tire/wheel assemblies 12, enabling it to be easily transported to most job sites. The details of mobile unit 1 are shown particularly in FIG. 2 and are discussed further below.

A conduit, indicated generally at 15, which may include a flexible joint 16, extends into a top opening 17 of tanker 1 to provide communication with air space 18 formed within tanker 1 above liquid roofing material 2. Conduit 15 may include an elbow 19 which extends through opening 17 and is sealed by a substantially fluid-tight seal to prevent the escape of the noxious fumes, indicated at 20, into the surrounding atmosphere. Conduit 15 is connected at the opposite ends to the inlet of a plenum 22 of filtration unit 10, preferably by a flexible section of conduit 23.

In further accordance with the invention, a collection hood 25 will be mounted closely adjacent the open top of rooftop carrier 3 for drawing noxious fumes 26 into the hood and then into a second conduit 27. The collected fumes will be transported into plenum 22 through a flexible elbow 28 or other usual conduit-type of connection. Conduit 27 may be temporarily secured to building 30 by brackets 31, if necessary, depending upon the height of the building and location of filtration unit 10 with respect thereto.

Figure 2:
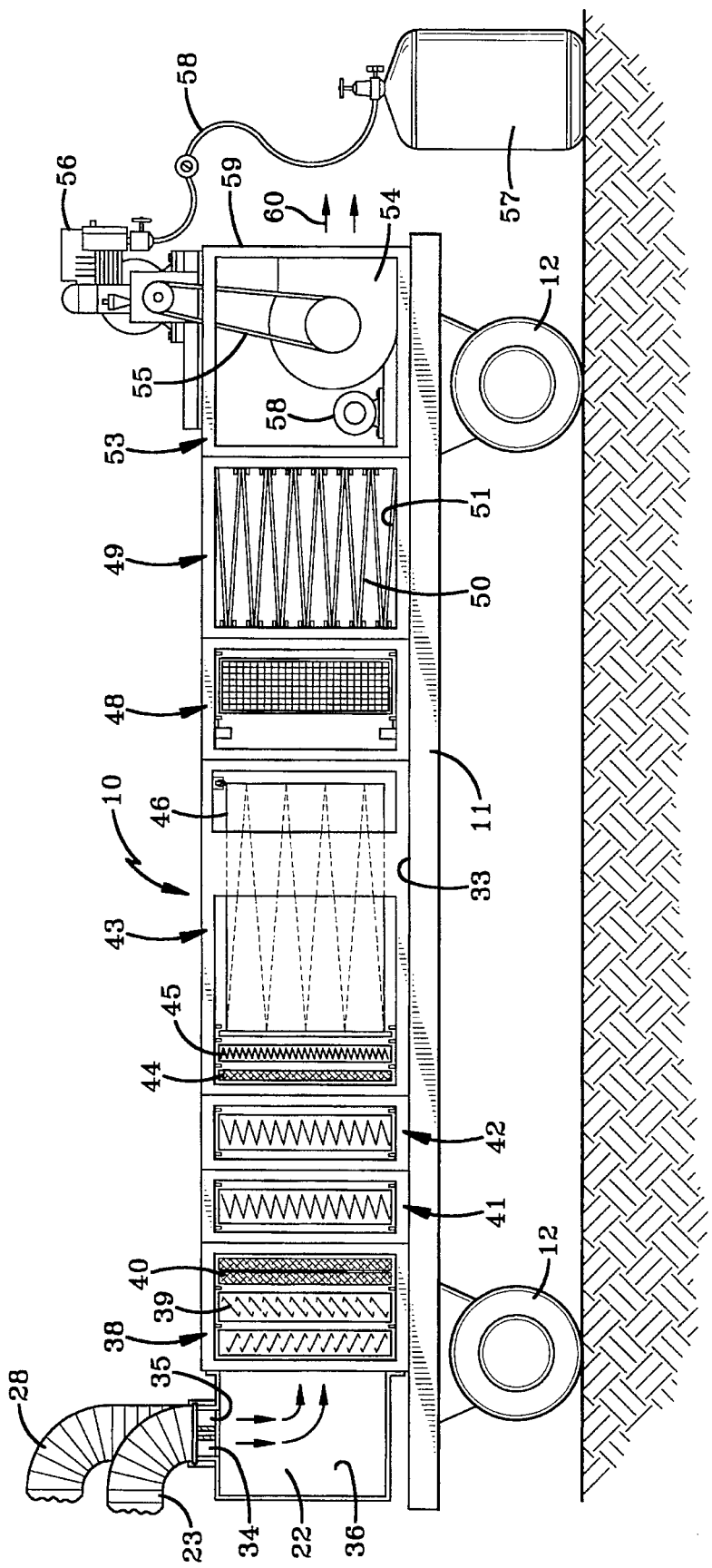
FIG. 2 is an enlarged view of the mobile filtration unit of the system shown in FIG. 1, with the side of the filtration unit being removed to show the various filtering media contained therein.

Referring to FIG. 2, filtration unit 10 includes a number of individual filtration compartments connected in and end-to-end relationship and mounted on and extending along the flat top surface 33 of trailer 11. Each of the filtering compartments or chambers is comprised of a heavy gauge sheet metal frame to form the chamber, which frames are bolted together in the end-to-end relationship. Numerous types of specific-purpose permanent and disposable filters are sequentially installed throughout filtration unit 10. Although the unit is essentially self contained, routine maintenance in the form of cleaning and filter replacement is carried out for efficient operation.

Plenum 22 includes a pair of openings 34 and 35 which communicate with the outlets of conduits 15 and 27, whereby fumes 20 and 26 flow into the hollow interior 36 of plenum 22. A first filtration cabinet 38 is mounted adjacent plenum 22 and is referred to an impinger module. Its main purpose is the removal of major amounts of airborne oil, grease, and solvent residues. This impinger module will contain a series of impingers 39 formed of sheet metal, and an aluminum mesh filter 40. The next two filtration chambers, indicated at 41 and 42, referred to as multi-vee cabinets, are used as pre-filters for larger particulates in dry or slightly wet vapors of gas or dust. These filters usually contain a disposable treated paper filter medium.

The next filtering chamber, indicated at 43, is intended for the filtering of oil mist and smoke fumes. Filter module 43 includes an initial aluminum mesh filter 44 at the inlet end thereof, a treated paper filter 45, and vee bags 46, which collect any particles passing through the other filters. The next filtering cabinet is referred to a HEPA cabinet 48, and functions as a secondary fine filter for smoke films and soot. It will contain a fine particulate air filtering material, which in the preferred embodiment is rated 99.97% efficient at 0.3 microns. The final filtering cabinet or module, indicated at 49, is a carbon filter. It contains a plurality of removable trays 50 containing granular activated carbon 51. This activated carbon will remove odors, gases and vapors remaining in the fumes after the fumes leave HEPA chamber 48.

The final chamber or compartment, indicated at 53, is the blower module. It contains a blower housing 54 containing a usual internal blower (not shown), which is connected by a drive belt 55 to an internal combustion engine 56. Engine 56 may be gasoline driven, or in the preferred embodiment, is connected to a tank of liquid propane 57 by a regulated fluid supply line 58. Alternatively, if a supply of electricity is readily available, a usual electric drive motor 58, which is also mounted within blower module 53, may be connected by a drive belt to blower housing 54 for rotating the internal blower. The blower draws air from plenum 22 through the various filtering modules and through an outlet opening 59 and into the surrounding atmosphere. The vapors being discharged, as shown by arrows 60, are relatively free of most harmful particulates, odors and other noxious contaminants. The blower will create a negative pressure within filtration unit 10, as well as within top air space 18 of tanker 1, and within hood 25 adjacent rooftop carrier 3, in order to draw the noxious fumes through conduits 15 and 27 and into plenum 22 of filtration unit 10 for filtration before being discharged to the atmosphere through outlet opening 59.

A typical site setup, shown particularly in FIG. 1, will position the filtration unit 10 on level solid ground near tanker 1 adjacent the side of the building, wherein the application of a heated roofing material is desired. The various lengths of flexible conduits forming conduits 15 and 27 will be connected between the inlets of plenum 22 and tanker 1 and rooftop carrier 3. The particular configuration and makeup of the individual conduits can vary depending upon the particular job site and the length of conduit needed to extend between filtration unit 10, tanker 1 and rooftop carrier 3. Hood 25 preferably is positioned approximately two feet above the opening of the rooftop carrier, whereas the cover on tanker 1 preferably forms an airtight closure with the conduit. Each of the filtration modules preferably has an access door (not shown) which is closed and latched in a generally airtight condition upon startup, after the various filtering media contained therein are checked and are in a clean state from a previous roofing job site.

The particular filtering arrangement of filtration unit 10 described above has been found to provide the most desired sequence of filters, with the individual filters thereof being of the particular type described above. These filtration modules preferably are of the type manufactured and sold by Aercology, Inc. of Old Saybrook, Conn., which are identified under its trademark "Modular Media Filters". The size of the various modules and particular filtering media contained therein will depend upon the particular tanker size, blower motor, and job applications with which the mobile system will be utilized.

Accordingly, the system of the present invention for removal of noxious fumes is simplified, provides an effective, safe, inexpensive, and efficient system which achieves all the enumerated objectives, provides for eliminating difficulties encountered with prior systems, and solves problems and obtains new results in the art.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved system is constructed and used, the characteristics of the construction, and the advantageous, new and useful results obtained; the new and useful structures, devices, elements, arrangements, parts and combinations, are set forth in the appended claims.

We claim:

1. A system for reducing the transmission of noxious fumes into the surrounding air during the application of a liquid roofing product on a roof, said system including:

a mobile vessel adapted to contain a supply of a liquid roofing product;

a mobile filtration unit having an inlet and an outlet;

first duct means extending between the vessel and the filtration unit for drawing fumes accumulating above the roofing product within the vessel into the filtration unit;

a mobile carrier adapted to hold a quantity of the roofing product on a roof of a building adjacent the vessel and filtration unit;

second duct means extending between the carrier and the filtration unit for drawing fumes from the carrier into the filtration unit; and blower means for moving the fumes from the carrier and vessel through the filtration unit to condition the fumes before discharging them into the surrounding atmosphere.

2. The system defined in claim 1 in which the filtration unit includes a trailer movably mounted on wheels and a plurality of filter chambers mounted on said trailer and in fluid communication with each other.

3. The system defined in claim 2 in which each of the filter chambers includes a substantially air-tight housing; and in which the filter chamber housings are connected in an end-to-end relationship along the trailer.

4. The system defined in claim 2 in which one of the filter chambers contains treated filter paper for removing particulates from the fumes.

5. The system defined in claim 2 in which one of the filter chambers contains a mesh filter for removing particulates from the fumes and bags for collecting said particulates removed by the mesh filter.

6. The system defined in claim 2 in which one of the filter chambers contains a HEPA filter for removing fine particulates from the fumes moving through the filtration unit.

7. The system defined in claim 2 in which one of the filter chambers contains granular carbon.

8. The system defined in claim 2 in which the filtration unit includes a plenum at the inlet; and in which the first and second duct means communicate with said plenum.

9. The system defined in claim 2 in which the blower means is located adjacent the outlet of the filtration unit; in which the blower means includes a blower and an engine for driving said blower; and in which the blower creates a negative pressure in the filtration unit for moving the fumes into and through the filter chambers.

10. The system defined in claim 9 in which the engine is an electric motor.

11. The system defined in claim 9 in which the engine is an internal combustion engine.

12. The system defined in claim 2 in which one of the filter chambers contains an impinger.

13. The system defined in claim 2 in which one of the filter chambers contains a disposable treated paper filter medium.

14. The system defined in claim 1 in which the second duct means includes a hood mounted above the carrier for collecting fumes escaping from the carrier and a duct extending between the hood and the inlet of the filtration unit.

15. The system defined in claim 1 in which a product supply line extends between the vessel and the carrier for delivering the roofing product from the vessel to the carrier.

16. The system defined in claim 1 in which the vessel is formed with a top access opening; and in which the first duct means includes a duct communicating with the top access opening in a substantially air-tight relationship.

17. The system defined in claim 1 in which the mobile vessel is a self-contained tanker.

18. A system for reducing the transmission of noxious fumes into the surrounding atmosphere during the application of a liquid roofing material, said system including:

a mobile vessel adapted to contain a supply of the liquid roofing material;

a mobile filtration unit having an inlet and an outlet;

first duct means extending between the vessel and the filtration unit for drawing fumes emanating from the liquid material and accumulating above the material within the vessel into the filtration unit;

a mobile carrier adapted to hold a quantity of the roofing material on a roof of a building adjacent the vessel and filtration unit;

second duct means extending between the carrier and the filtration unit for drawing fumes from the carrier into the filtration unit; and means for moving the fumes from the vessel and carrier through the first and second duct means and through the filtration unit to condition the fumes before discharging them into the surrounding atmosphere.

19. The system defined in claim 18 in which the means for moving the fumes from the vessel and carrier is a blower located adjacent the outlet of the filtration unit for creating a negative pressure in the filtration unit for moving the fumes into and through the filtration unit.

20. A system for reducing the transmission of noxious fumes emanating from a material into the surrounding atmosphere, said system including:

a mobile vessel adapted to contain a supply of the material;

a mobile filtration unit having an inlet and an outlet;

first duct means for transferring fumes emanating from the material in the vessel into the filtration unit;

a mobile carrier adapted to hold a quantity of the material;

second duct means for transferring fumes from the carrier into the filtration unit; and means for moving the fumes from the vessel and carrier through the filtration unit to condition the fumes before discharging them into the surrounding atmosphere.

21. The system defined in claim 20 in which the means for moving the fumes from the vessel and carrier is a blower located adjacent the outlet of the filtration unit for creating a negative pressure in said filtration unit for moving the fumes therethrough.

22. The system defined in claim 20 in which the filtration unit includes a plurality of filter chambers containing a mesh filter, treated filter paper, granular carbon and a HEPA filter for conditioning the fumes before discharging them into the surrounding atmosphere.

* * * * *